US005078352A

United States Patent [19]

Brow

[11] Patent Number: 5,078,352

[45] Date of Patent: Jan. 7, 1992

[54] FOLDING SAWHORSE

[76] Inventor: Calvin J. Brow, 90 Sunset Vista La., Selah, Wash. 98942

[21] Appl. No.: 637,678

[22] Filed: Jan. 7, 1991

[51] Int. Cl.⁵ .............................................. F16M 11/38

[52] U.S. Cl. ........................................ 248/166; 182/153

[58] Field of Search ............... 248/166, 165, 168, 169; 182/153, 155, 225, 181, 182

[56] References Cited

U.S. PATENT DOCUMENTS

| | | | |
|---|---|---|---|
| 1,713,359 | 5/1929 | Thomas | 182/155 |
| 2,427,540 | 9/1947 | Wierowski | 182/153 |
| 2,594,464 | 4/1952 | Loucks | 182/155 X |
| 3,148,746 | 9/1964 | Juculano | 182/153 |
| 4,113,056 | 9/1978 | DeLorenzo | 182/181 X |
| 4,238,001 | 12/1980 | Alexander | 182/225 X |
| 4,502,563 | 3/1985 | Pershon | 248/166 X |
| 4,730,698 | 3/1988 | Harris | 182/225 X |
| 4,756,386 | 7/1988 | Blanchard | 182/182 X |

*Primary Examiner*—J. Franklin Foss
*Attorney, Agent, or Firm*—Robert W. Jenny

[57] ABSTRACT

The foldable sawhorse comprises a two-by-four wooden work member supported in a sheet metal channel near each of its ends. The channels are supported by two tubular leg assemblies pivotally attached to the channels. The pivotal attachments comprise an eye extending from the bottom of each channel and passing through holes in the walls of the legs of the leg assemblies. Each leg assembly comprises two legs and a base; the legs are flattened in crossection at one of their ends and welded to the base near its ends with the long dimension of the flattened section parallel to the axis of the base. The center portions of the bases are raised a distance equal to about ⅛ the lengths of the bases and are interconnected by a strap which determines the angles between the legs when the sawhorse is unfolded. A lock is provided to prevent inadvertent folding of the leg assemblies toward each other. It comprises a flat rectangular part with two L-shaped slots located such that one leg of each slot is close and parallel to the ends of the part and the other legs extend toward each other and are close and parallel to the bottom edge of the part. The part is attached by collared fasteners to two of the legs near their pivoted connection to a channel such that when the leg assemblies are unfolded the lock part is allowed to move so that the collars of the fasteners are in the slot portions parallel to the ends of the part, preventing the sawhorse from being folded until the lock part is manually lifted to allow the fasteners to move toward each other in the slot portions parallel to the bottom edge of the lock part.

2 Claims, 2 Drawing Sheets

FOLDING SAWHORSE

BACKGROUND OF THE INVENTION

1. Field

The subject invention is in the field of small structures, specifically collapsible and foldable structures such as step ladders, scaffolds and the like and, more specifically, sawhorses.

2. Prior Art

There is much prior art in this specific field patented and not patented. The patents listed below are a sample of patented prior art sawhorses and related equipment.

| U.S. Pat. Nos.: | |
|---|---|
| 249,508 | 2,558,915 |
| 1,435,738 | 4,752,047 |
| 2,986,230 | 4,911,390 |

In each instance the general purposes are to provide a sawhorse or similar support structure which can be collapsed or folded to facilitate transporting and storing the structure and to provide the structure at commercially competitive cost. In each instance also there is an inherent compromise involving the functional utility, the degree of collapsibility and the cost of the structure, the cost of structures of equivalent utility tending to be less for those that are less collapsible. Another important factor in concepts for sawhorses is that the horizontal member, termed the work member for purposes of this application, be made of material which will not harm saws and the like which come into contact with the work member, wood being a material of choice. For cost comparisons of various concepts the cost of the work member can be considered a constant, so that the cost comparisons are based on the costs of the supports, pivots, locks and the like used in the sawhorses.

As noted previously, comparisons of costs of sawhorses are valid only when the sawhorses being compared have equivalent collapsibility. There are two general orders of collapsibility. In one the supports (legs) fold together and up toward the work member such that all the dimensions except the length of the work member are reduced. (In some cases even that dimension is reduced.) In the second order the supports are folded so that the collapsed structure can be characterized as flat and uses a minimum of floor space when stored against or hung on a wall. Sawhorses having this second order of collapsibility are generally recognized as less costly than sawhorses having the first order of collapsibility and more cost effective considering overall utility, first cost, storage space required and time and effort required to erect and collapse. Sawhorses having the second order of collapsibility as defined above are termed foldable sawhorses for purposes of this patent application.

It is well understood in the art that the cost effectiveness of a foldable sawhorse of specific size and utility depends directly on its structural efficiency; that is, its structural requirements are met with relatively few parts, all of simple configuration and a significant portion of them commercially available.

The primary objective of the subject invention is provision of a foldable sawhorse which can be competitively priced because of its high structural efficiency. Corollary objectives are that each of its parts be simple and easy to manufacture, that the number of parts be minimal, that its assembly be simple and that its use be simple and safe.

SUMMARY OF THE INVENTION

The subject invention is a foldable sawhorse having high structural efficiency. The work member of the sawhorse is a commercially available two-by-four piece of wood approximately four feet long. It is mounted in and supported by two sheet metal channels, one attached to the work member near each of its ends. The channels are supported by two leg assemblies. Each leg assembly comprises two legs and a base, each made of commercially available steel tubing. The length of the bases is approximately equal to the length of the work member. Each base is bent to comprise two coaxial end portions, and a center portion displaced several inches off the axis of the coaxial end portions. The end portions, the center portion and the portions interconnecting them lie in a plane. One end of each leg assembly is flattened and welded to the base near one of its ends such that the long axis of the crossection of the flattened end is parallel to the axis of the end portions of the base, the legs are parallel and the legs and base of each leg assembly lie in a plane.

When the sawhorse is unfolded the bases are separated and approximately 24 inches apart and the ends of the legs not attached to the bases adjoin in pairs under the channels. These ends are cut so that each pair of end surfaces is flat with the ends coplanar in a horizontal plane to evenly contact and support the flat bottom surfaces of the channels. These ends are also pivotally connected to the channels by an eye which is a semi-circular shaped rod which extends from the bottom of the channel, into the bore of one leg, through a hole in the wall of that leg, through a similar hole in the wall of the adjoining leg, into the bore of the second leg and back to the bottom of the channel. A preferred method for attaching the eye to the bottom of the channel is to extend the ends of the eye through the bottom of the channel and bend them at right angles in the same direction so that they lie against the inside of the bottom of the channel and the eye is held in place by a pop rivet and the attachment of the working member in place in the channel. The working member is held in the channels by wood screws driven into the member through holes in the sides of the channels.

A strap is installed between the center portions of the leg assemblies such that when the assemblies are unfolded, i.e. spaced apart at the bases, the angles between the pairs of legs are such that the ends of the legs contacting the channels are coplanar as described above.

A lock is provided to keep the sawhorses from inadvertently folding and to keep it unfolded during use. The lock piece is a flat, sheet metal rectangle with two L shaped slots in it, the slots being located so that two of the legs of the slots are close to and parallel to the ends of the rectangle and the other two legs of the slots extend toward each other and are parallel and close to the edge of the rectangle which is its bottom edge when it is installed. Tubular spacers with equal lengths slightly greater than the thickness of the lock piece fit one in each slot and the lock piece is held in place by flat head screws driven one into each of one pair of legs through the spacers. The location of the screws is such that when the sawhorse is unfolded the spacers fit freely in the slot legs near the ends of the lock piece and the long dimension of the lock piece is horizontal. Folding of the leg assemblies toward each other is prohibited by the spacers in these legs of the slots in the lock piece. To fold the sawhorse, the lock piece is manually raised so that the spacers are free to move in the slot legs close to and parallel to the bottom edge of the lock piece and thus can move toward each other and allow the sawhorse to fold. When the sawhorse is unfolded fully the lock piece automatically falls into its lock position.

The invention is described in more detail below with reference to the attached drawings.

DETAILED DESCRIPTION OF THE INVENTION

Figure 1:
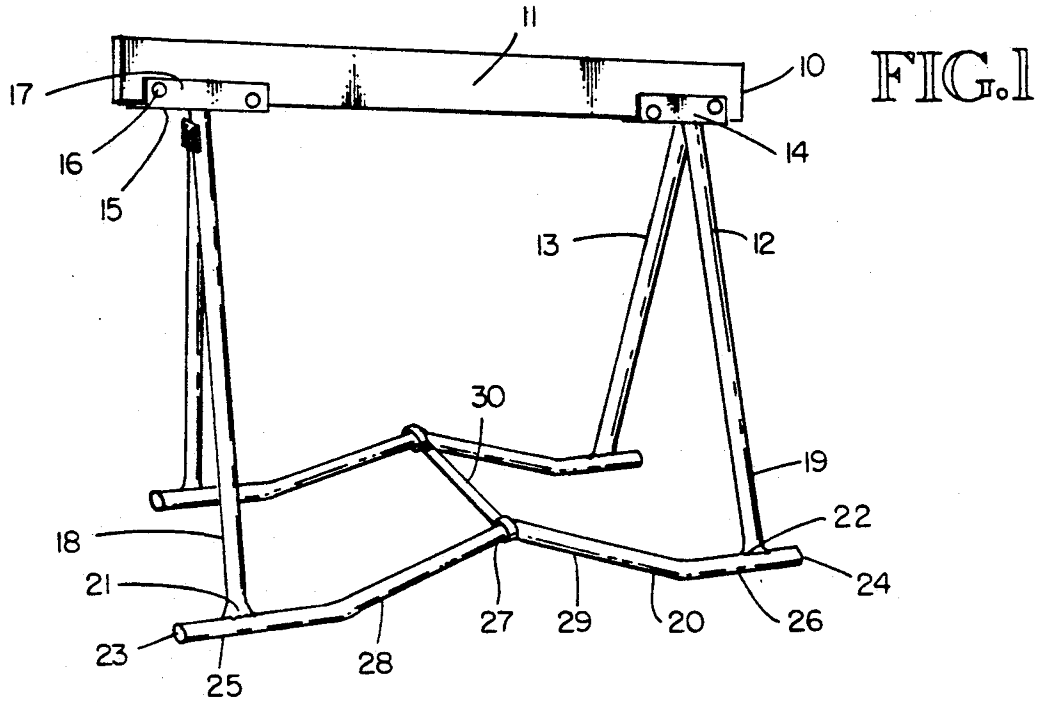
FIG. 1 is a perspective view of the sawhorse unfolded and ready for use.

The subject invention is a sawhorse having leg assemblies which fold together for purposes of storing and shipping the sawhorse. Referring to FIG. 1, the sawhorse 10 comprises a work member 11 supported by leg assemblies 12 and 13 which are pivotally attached side-by-side to channels 14 and 15 in which the work member is attached by fasteners, fastener 16 being typical, driven through holes in the sides of the channels, side 17 being typical.

Each leg assembly comprises two legs, legs 18 and 19 being typical. and a base, base 20 being typical. Ends 21 and 22 of the legs are flattened and welded to the base near its ends 23 and 24 with the legs parallel and essentially perpendicular to the base and the long axes of the flattened crossections of the ends essentially parallel to the axis of the base. The base comprises the end portions 25 and 26 to which the legs are attached, a center portion 27 and interconnecting portions 28 and 29. The axes of the end portions are coincident and the center portion is displaced laterally in the plane of the axes of the legs and away from the axes of the end portions. The amount of displacement is preferably approximately 1/8 the length of the base. The extensions of the bases beyond the legs is important to the stability of the sawhorse, the bases extending to be at least as long as the work member.

The center portions of the bases are interconnected by a strap 30. The strap establishes the distance between the bases, that is the maximum angle of the angles of separation between the two leg assemblies.

Figure 2:
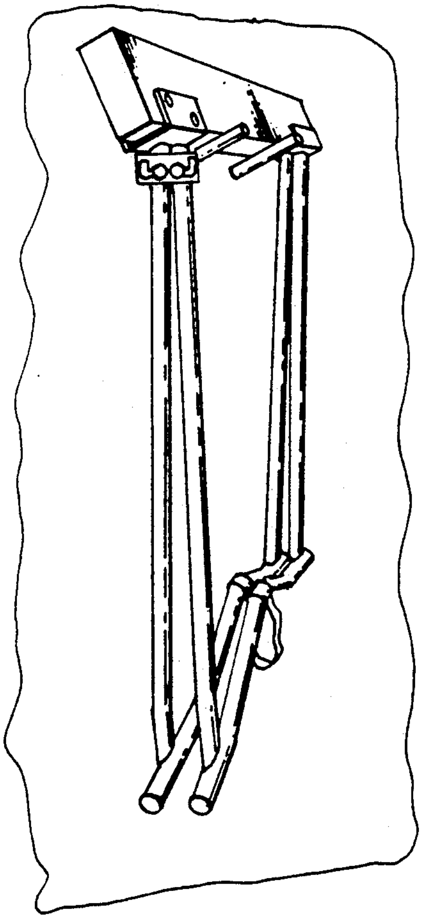
FIG. 2 is a perspective view of the sawhorse folded and stored on pegs on a wall.

In FIG. 2 the sawhorse is folded and stored on pegs on a wall.

Figure 3:
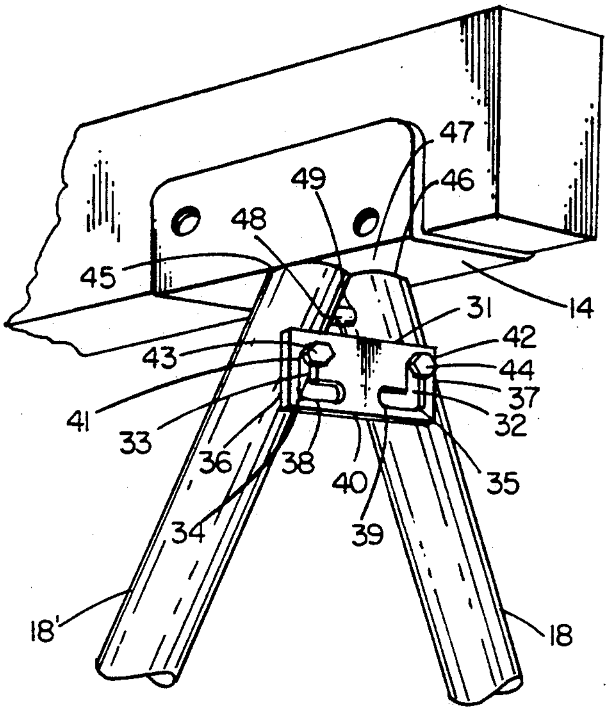
FIG. 3 is a perspective view showing the lock and the juncture of leg portions with the underside of the channel.

FIG. 3 illustrates the juncture of the two legs 18 and 18$^1$ attached to channel 14 and also illustrates lock piece 31. Legs 32 and 33 of L-shaped slots 34 and 35 are close to and parallel to ends 36 and 37 of the lock piece. Legs 38 and 39 of the slots are close to and parallel to bottom edge 40 of the lock piece. The lock piece is attached to the legs by fasteners 41 and 42 which have spacer collars (not visible in this view) around their shanks so that when the fasteners are securely tightened in place there is enough clearance between heads 43 and 44 and the legs so that the lock piece is held close to the legs but free to move relative to them and the collars on the fasteners. In operation, when the leg assemblies are unfolded to the extent allowed by the strap, the collars on the fasteners align with the vertical legs of the slots and the lock piece moves under the force of gravity so that the collars are at the ends of those legs of the slots and the lock is engaged such that the leg assemblies cannot be folded together unless the latch piece is manually operated to allow the collars to move in the horizontal legs of the slots.

The attachment of the legs of the leg assemblies to the channels and work member is also illustrated in FIG. 3. Ends 45 and 46 of legs 18 and 18$^1$ are cut at an angle which is the complement of half the angle between the legs so that the cut surfaces are coplanar and fit flush against bottom 47 of the channel. The ends are pivotally retained by eye 48 which passes through holes in the walls of the legs, hole 49 in leg 18 being visible in this view.

Figure 4:
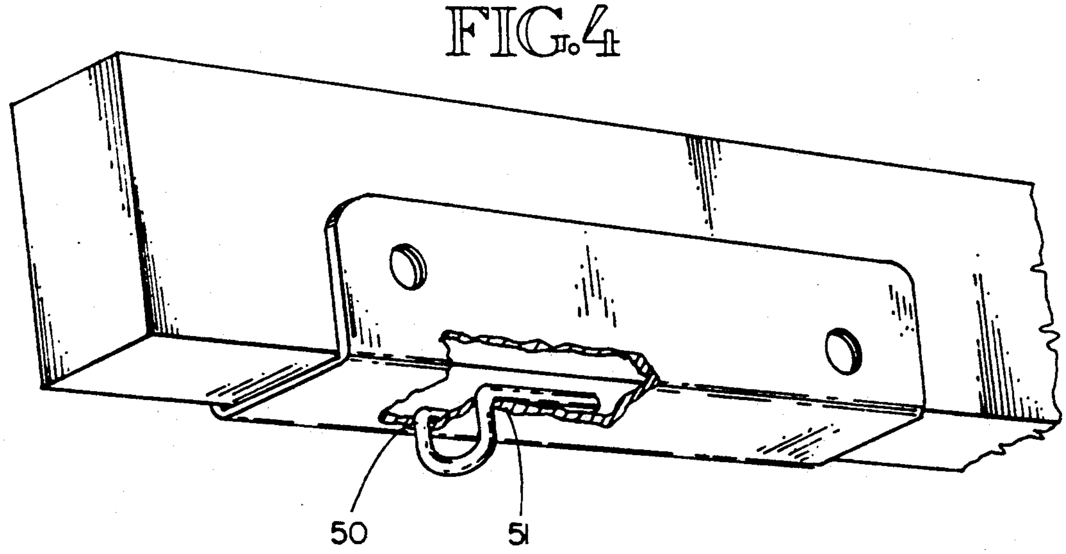
FIG. 4 is a cut-away, sectional perspective view illustrating the installation of a pivot eye in a channel.

Details of the eye in each channel and of their installation are shown in FIG. 4, a sectioned, cutaway perspective of an eye, a channel and an end of the work member. The eye is a rod bent into a U shape having a semi circular bottom and with the straight portions of the U bent at 90° out of the plane of the U. The distance of the centers of radius of the bends from the bottom of the U shape is approximately equal to the width of the U shape. The eyes are passed through the holes in the legs (omitted in this FIG. for clarity) with the leg assemblies held together. Then the ends of the eyes are inserted through holes in the bottoms of the channels, holes 50 and 51 being typical, and positioned with the bent ends of the U against the insides of the bottoms of the channels. The eyes are held in place by a pop rivet (not shown) driven along side of one of the legs of each eye. This assembly technique is made feasible by the fact that the apparatus functions entirely satisfactorily with the holes in the legs and bottoms of the channels enough larger than the rod used to make the eyes to provide the clearance needed for assembly as described. The installation of the work member also holds the eyes in place to provide the pivotal attachment of the leg assemblies to the work member.

It is considered to be understandable from this description that the invention meets its objectives. The subject sawhorse is structurally efficient. All of its parts are simple and either commercially available or readily made from commercially available material. The apparatus for pivotally connecting the leg assemblies to the work member in particular comprises only an eye for each pair of legs and the eyes are of small proportions because they do not carry the primary forces between the legs and work member. These forces are transmitted directly from work member to the channels to the ends of the legs. The lock mechanism comprises one stamped metal part, two fasteners and two spacers. The use of bases too which the legs are attached serves to structurally stabilize the legs and allow use of legs having minimal crossectional area. The stability provided by attaching the legs to the bases also contributes to the simplicity of the pivotal connection apparatus because the stability must otherwise be provided by the pivotal connection apparatus. Further on this point, the end portions of the bases provide ample footprint area to support the forces from the legs, particularly on soft surfaces such as turf and the raising of the center portions of the bases helps accommodate uneven support surfaces, compared to using straight tubes as the bases.

The interconnection of the bases by the strap apparatus also facilitates the simplicity and small size of the pivotal connection apparatus by relieving that apparatus of the significant loads to which it would be subjected if the spread of the legs was controlled by that apparatus.

It is also considered understandable that while one embodiment of the invention is described herein, other embodiments and modifications of the one described are possible within the scope of the invention which is limited only by the attached claims.

I claim:

1. A folding sawhorse comprising:

a work member havung a first end and a second end, a first channel having a first bottom and a second channel having a second bottom, a first leg assembly and a second leg assembly, each comprising a first leg and a second leg and a base, each of said bases having a first end portion, a center portion and a second end portion, said first and second legs each having first and second leg ends, said first legs being attached at said first leg end to said first end portions, said second legs being attached at said first leg end to said second end portions, said legs extending in the same direction from said base and being essentially parallel to each other, a strap interconnecting said center portions, said second ends of said legs being pivotally connected side-by-side to said first channel, said second ends of said second legs being pivotally attached side-by-side to said second channel, whereby said leg assemblies are foldable together and apart in a range of angles of separation having a maximum angle and said strap limits said angle at said maximum, said first channel being attached to said work member near said first end of said work member and said second channel being attached to said work member near said second end of said work member and, said sawhorse further comprising gravity operated lock means, said lock means being positioned near said second ends of said first legs, whereby when said leg assemblies are at said maximum of said angle of separation said lock means engages to lock said leg assemblies at said maximum of said angle, said lock means also being manually operable to disengage it and allow said leg assemblies to fold toward each other.

2. A foldable sawhorse comprising:

a work member, first and second channels, first and second eyes, first and second leg assemblies, a strap, a lock piece, first and second collared fasteners and a plurality of fasteners, said work member having a first end and a second end and a first length, said first channel being attached to said work member near said first end and said second channel being attached to said work member near said second end by said plurality of fasteners, said first eye being attached to said first channel and said second eye being attached to said second channel, said first and second leg assemblies being retained on said first and second eyes, whereby said first and second leg assemblies are pivotally attached to said first and second channels and said work member and foldable toward and away from each other in a range of angle of separation, each of said first and second leg assemblies comprising a first leg, a second leg and a base, said base having a second length essentially equal to said first length and having a first end portion, a second end portion and a center portion, said first leg being attached to said base at said first portion and perpendicular to it, said second leg being attached to said base at said second portion and perpendicular to it such that said legs extend in the same direction from said base and are essentially parallel, said strap being connected between said center portion of said base of said first leg assembly and said center portion of said base of said second leg assembly, whereby said angle of separation of said first and second leg assemblies is limited at a maximum by said strap, said lock piece being attached to said first legs of said first and second leg assemblies by said collared fasteners near said first eye and providing manually controllable means for locking said leg assemblies at said maximum of said separation angle and for unlocking said leg assemblies whereby said leg assemblies can fold together.

* * * * *